United States Patent

[11] 3,574,358

[72] Inventor Thomas R. Cassel
     Birmingham, Mich.
[21] Appl. No. 771,786
[22] Filed Oct. 30, 1968
[45] Patented Apr. 13, 1971
[73] Assignees Thomas R. Cassel
     Birmingham, Mich.
     fractional part interest to each;
     Kenneth W. Cassel
     Cincinnati, Ohio, fractional part interest to
     each; R. Nelson Cooksey, Indianapolis, Ind.
     , fractional part interest to each; Keevin J.
     Cassel, Union Lake, Mich., fractional part
     interest to each; William E. Neighbors, St.
     Petersburg, Fla., fractional part interest to
     each

[54] FLEXIBLE PIPE COUPLING
     7 Claims, 4 Drawing Figs.
[52] U.S. Cl. .................................................... 285/53,
     285/231, 181/35, 285/302
[51] Int. Cl. .................................................... F16l 21/02,
     F16l 27/12, F16l 59/14
[50] Field of Search .......................................... 285/231,
     302, 53, 47; 285/187; 181/72, 36.2, 35 (Cursory)

[56] References Cited
     UNITED STATES PATENTS
| | | | |
|---|---|---|---|
| 1,079,350 | 11/1913 | Kelly | 285/302 |
| 2,381,426 | 8/1945 | Allen et al. | 181/36.2 |
| 2,402,157 | 6/1946 | Griswold | 285/302X |
| 3,006,665 | 10/1961 | Harris | 285/302 |
| 3,151,701 | 10/1964 | Duthion et al. | 181/72 |
| 3,206,229 | 9/1965 | Kramer | 285/231X |
| 3,348,629 | 10/1967 | Cassel | 181/72 |
| 3,427,051 | 2/1969 | White et al. | 285/302X |

FOREIGN PATENTS
| | | | |
|---|---|---|---|
| 799,312 | 3/1936 | France | 285/231 |

Primary Examiner—Thomas F. Callaghan
Attorney—Barnard, McGlynn & Reising

ABSTRACT: A flexible pipe coupling particularly adaptable to an exhaust system for a motor vehicle having an internal combustion engine and a vehicle frame. The flexible coupling may be disposed generally midway of the exhaust system, at which point a first pipe, such as the exhaust pipe leading from the engine manifold, coaxially receives, or terminates adjacent the end of, a portion of a second pipe, such as the tailpipe extending rearwardly of the vehicle. An intermediate pipe is received about the ends of the exhaust pipe and the tailpipe, and is coaxial therewith. The intermediate pipe defines an annular chamber with the tailpipe, the chamber being in communication with the exhaust pipe. A first resilient seal is disposed between one end of the intermediate pipe and the exhaust pipe and a second resilient seal is disposed between one end of the intermediate pipe and the tailpipe. Heat insulating means are disposed between the resilient seals and the exhaust and tailpipes respectively, to limit heat transfer from hot exhaust gasses to the resilient seals and the intermediate pipe. The resilient seals and the dimensional parameters in the coupling permit angular movement of the exhaust pipe and tailpipe relative to each other, and the intermediate pipe may be formed so as to limit axial movement of the pipes relative to each other under operating conditions of the vehicle. The annular chamber between the intermediate pipe and the tailpipe is dimensioned so that the coupling acts as a sound-attenuating device, attenuating sounds in a particular range of frequencies emanating from the engine and passing with the exhaust gasses.

PATENTED APR 13 1971
3,574,358
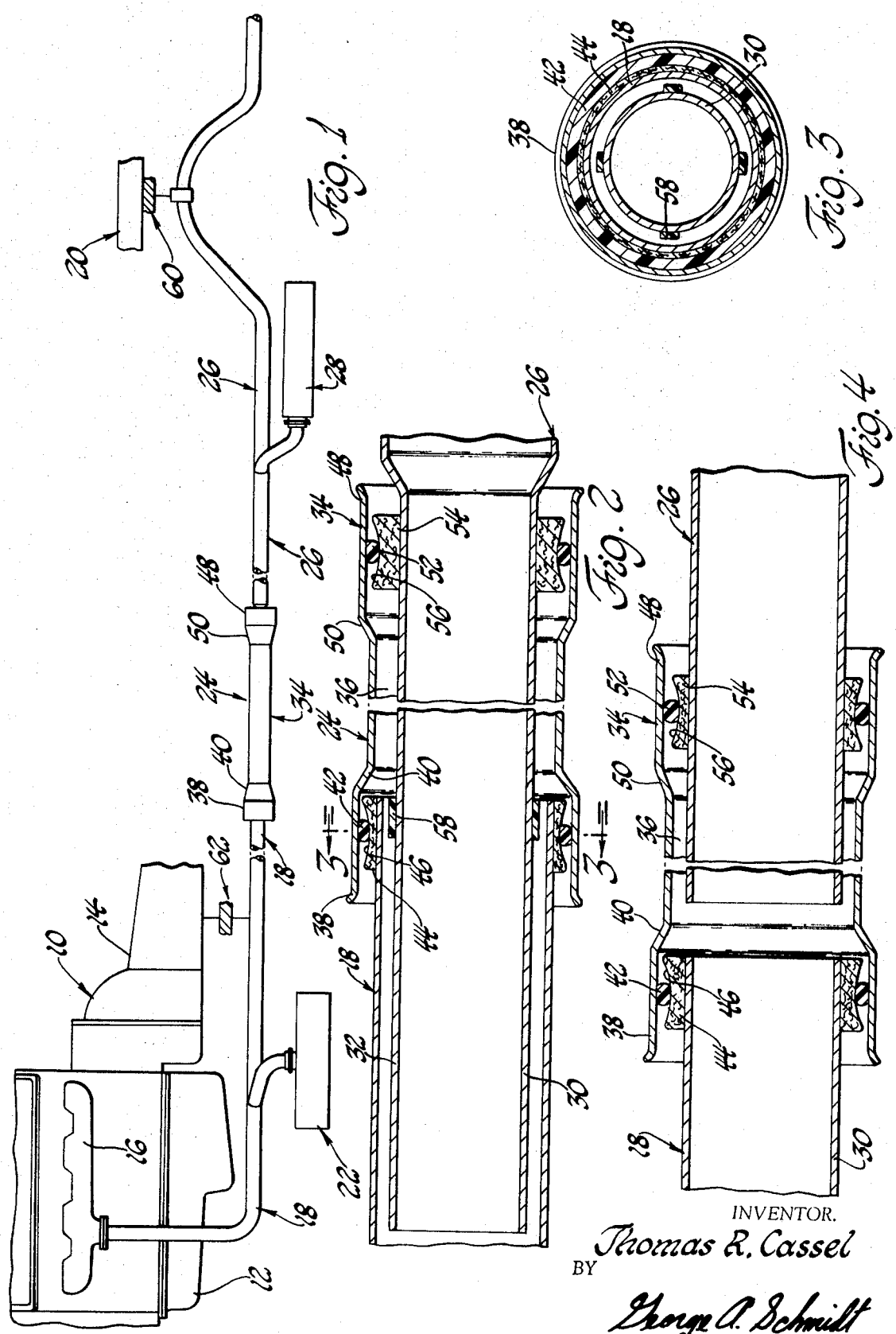
INVENTOR.
Thomas R. Cassel
BY
George A. Schmidt
ATTORNEY 3,574,358

FLEXIBLE PIPE COUPLING

DISCLOSURE

This invention relates to pipe couplings, and more particularly to a flexible pipe coupling adaptable to an exhaust system of a motor vehicle.

In the design and development of motor vehicles having internal combustion engines and vehicle frames, it is necessary and desirable to provide an exhaust system for conveying exhaust gasses from the engine to the atmosphere at a point rearwardly of the vehicle. It is in this exhaust system that sound-attenuation devices are utilized to attenuate certain sounds emanating from the engine and travelling with the exhaust gasses. Such exhaust systems normally employ steel pipes, secured in some suitable manner to the exhaust manifold, and extending rearwardly for attachment to and support by the vehicle frame in suitable fashion. Sound-attenuating devices, such as mufflers, resonators, quarter-wave tuners and the like, are disposed at suitable intervals or in a single assembly in the piping system.

Exhaust systems commonly employed in motor vehicles have been designed so that the exhaust pipes and sound-attenuating devices are secured together to form a rigid unit, rigidly attached at the exhaust manifold and extending rearwardly beneath the vehicle. Since there are vibrations and relative movements in the various parts of the vehicle, it is necessary to mount the exhaust system to the frame for support by flexible connections, thus damping any vibrations and preventing transfer of vibrations to the vehicle itself. These are complicated and cumbersome systems that predicate location of sound-attenuation devices on mounting and vibration-damping possibilities, rather than on optimum location of sound-attenuation devices to best cope with the sounds they are intended to attenuate. There has been little effort in the past to provide the desired flexibility in the exhaust system and thus permit better design and location of sound-attenuation devices.

The device in which this invention is embodied comprises, generally, a flexible coupling particularly suitable for the exhaust system in an automotive vehicle, which is also formed as a sound-attenuating device and may be an integral part of the exhaust system. The usual exhaust system includes an exhaust pipe extending from the exhaust manifold of the engine and a tailpipe extending rearwardly from some intermediate terminus of the exhaust pipe to the rearward portion of the vehicle. It is here proposed that the tailpipe either extend into and coaxially with the rearward portion of the exhaust pipe, or terminate adjacent the end of the exhaust pipe, and extend therefrom to convey the exhaust gasses to the desired location for discharge to the atmosphere. Surrounding a terminal portion of the exhaust pipe and a portion of the tailpipe and coaxial with both pipes, is an intermediate pipe section of larger diameter than the diameter of the portion of the tailpipe which it surrounds. An annular chamber is defined between the intermediate pipe and the tailpipe that communicates with the exhaust pipe outlet. A resilient seal engages the intermediate pipe at each end; i.e., sealing the overlapping portion of the intermediate pipe and the tailpipe. Heat insulation means, such as an annular asbestos member, is disposed between each of the resilient members and the associated exhaust or tailpipe, to limit heat transfer from the hot exhaust gasses to the intermediate pipe section. The resilient seal members effectively prevent air or gas flow from the annular chamber and out of the intermediate pipe. The intermediate pipe is so formed adjacent the flexible sealing members to permit only limited spacial movement of the intermediate pipe relative to either the exhaust pipe or the tailpipe. The flexible sealing members and the dimensional parameters of the coupling permit angular movement of the exhaust pipe relative to the tailpipe and of the intermediate pipe relative to each of the other two. Thus, a degree of flexibility is provided which both damps vibrations in the exhaust pipe or the tailpipe and at the same time permits relative movement therebetween.

A device so constructed and integrated into an exhaust system, in addition to providing sound attenuation and vibration damping in the system, permits the exhaust system to be rigidly mounted on the engine mass and on the vehicle frame rearwardly of the coupling, for better exhaust system design. At the same time, such a system permits optimum location of sound-attenuation devices, should various wavelength frequencies be attenuated at different locations along the length of the exhaust system. This leads to a more efficient treatment of exhaust gasses from the internal combustion engine. The overall construction is less expensive and less cumbersome than presently available system, the flexibility of the coupling providing several functions in one structure for greater efficiency.

These and other advantages will become more apparent from the following description, used to illustrate a preferred embodiment of the invention when taken with the accompanying drawing in which:

FIG. 1 is a partial schematic view of an exhaust system for an internal combustion engine embodying the present invention;

FIG. 2 is an enlarged cross-sectional view of an exhaust system as illustrated in FIG. 1, showing the flexible coupling embodying the present invention;

FIG. 3 is a transverse cross-sectional view of the flexible coupling illustrated in FIG. 2, taken substantially along the line 3—3 of FIG. 2 and looking in the direction of the arrows; and FIG. 4 is a cross-sectional view of a modification of the flexible coupling illustrated in FIGS. 2—3 and embodying the present invention.

Referring more particularly to the drawing, where the FIGS. are for the purpose of illustrating a preferred embodiment of the invention only and not for the purpose of limiting same, FIG. 1 best illustrates the overall exhaust system construction and general environment for one application of the present invention. As illustrated in FIG. 1, and as is found in most motor vehicle constructions, an engine mass, indicated generally by the numeral 10, is shown to include an internal combustion engine 12 of the usual form, to which is connected a clutch and/or transmission assembly 14 to extend generally rearwardly of the engine 12. Engine 12 includes an exhaust manifold 16 that communicates with the engine cylinders internally of the engine in the manner well known in the art. An exhaust pipe, indicated generally by the numeral 18, is rigidly connected in any suitable manner to the exhaust manifold 16 for conveying the exhaust gasses from the engine 12. It is the usual motor vehicle construction to mount the engine mass 10 in some suitable manner on the frame, a portion of which is indicated generally at 20, the frame supporting the remainder of the vehicle construction. As the frame 20 and the engine mounting thereon are standard constructions, form no particular part of the present invention and are well known in the art, only a small portion of the frame is shown for convenience in describing the present invention.

With further reference to the exhaust system, the exhaust pipe 18 extending from the exhaust manifold 16 may have included or connected therewith a sound-attenuating device, indicated generally by the numeral 22, which may be of the type and located in the manner described and claimed in the copending U.S. Pat. application, Ser. No. 703,591, filed Feb. 7, 1968 in the name of the present inventor. The connection of the sound-attenuating device 22 to the exhaust pipe 18 may be such as that illustrated and described in the copending U.S. Pat. application, Ser. No. 685,493, filed Nov. 24, 1967 in the name of the present inventor. The exhaust pipe 18 extends rearwardly from the sound attenuating device 22 to a flexible coupling, indicated generally by the numeral 24 and which will be hereinafter more particularly described. Extending rearwardly from the sound-attenuating device and flexible coupling 24 is a tailpipe, indicated generally by the numeral 26, which terminates adjacent the rearward end of the vehicle in the usual manner. A third sound-attenuating device, indicated generally by the numeral 28, may be disposed in tailpipe 26 in the manner and as described in the aforementioned patent applications. The sound-attenuating devices 22, 24 and 28 may be so formed and dimensioned as to attenuate sounds in differing ranges of frequencies and in different manners, as described in the aforementioned patent applications.

With reference to FIGS. 2 and 3, a preferred embodiment of the flexible coupling and sound-attenuating device 24 will now be described. The exhaust pipe 18 is shown to receive a reduced diameter portion 30 of the tailpipe 26, the tailpipe 26 extending outwardly therefrom and toward the rearward portion of the vehicle. It is intended that the reduced diameter portion 30 and the exhaust pipe 18 be coaxial and of such diameters as to properly convey the exhaust gasses from the engine 12 in the usual manner. As the reduced diameter portion 30 of the tailpipe 26 is of lesser diameter than the exhaust pipe 18, an annular passage 32 is defined between the overlapping portions of the two pipes.

Surrounding the terminal end of the exhaust pipe 18 and a portion of the tailpipe 26 is an intermediate pipe, indicated generally by the numeral 34. It is intended that the intermediate pipe 34 be coaxial with the exhaust pipe 18 and the tailpipe 26, and of larger diameter than the portion 30 of the tailpipe 26 that the intermediate pipe 34 surrounds. Such difference in diameters between the intermediate pipe 34 and the tailpipe portion 30 defines an annular chamber 36 for attenuating sounds in the exhaust system in a manner to become hereinafter more apparent.

At the left-hand end of the intermediate pipe 34, as viewed in FIG. 2, is an enlarged portion 38 which overlaps the terminal end of the exhaust pipe 18. A frustoconical section 40 blends the end 38 of the intermediate pipe with the central portion thereof. Disposed between the enlarged end 38 of the intermediate pipe 34 and the end of the exhaust pipe 18 is a resilient seal member 42, which may conveniently take the form of an O-ring seal or the like. Seal 42 prevents any air or gas flow between the intermediate pipe enlargement 38 and the exhaust pipe 18. In order to limit heat transfer from the hot exhaust gasses in the exhaust pipe 18 to the intermediate pipe 34, an annulus of heat insulating material 44 is provided. Such annulus may be of any suitable material, such as asbestos, and is fixed in relation to the outer surface of the exhaust pipe 18, as by bonding or other securement. A generally concave outer surface 46 on the annular member 44 assists in retaining the flexible sealing ring 42 in its proper position relative to the intermediate pipe enlargement 38 and the exhaust pipe 18.

At the right-hand end of the intermediate pipe 34, as viewed in FIG. 2, a similar structure is formed in which an enlargement 48 overlies a portion of the tailpipe 30 and which is blended to the central portion of the intermediate pipe 34 by frustoconical section 50. Disposed between the intermediate pipe enlargement 48 and the tailpipe section 30 is a resilient seal member 52, which may conveniently take the form of an O-ring seal or the like. An annular heat-insulator member 54 is disposed between the enlargement 48 and the tailpipe portion 30 to limit heat transfer from the hot exhaust gasses to the intermediate pipe 34. A generally concave outer surface 56 on the heat-insulating annulus 54 assists in properly orientating and retaining the resilient seal member 52 relative to the enlargement 48 and the tailpipe 26.

It will be apparent that the frustoconical portions 40 and 50 of the intermediate pipe 34 will allow limited axial movement of the intermediate pipe 34 relative to the exhaust pipe 18 and the tailpipe 26. Upon excessive movement, the frustoconical section 40 or 50 will engage the heat-insulating member 44 or 54, depending on the direction of relative movement. Since the heat-insulating annuli 44 and 54 are fixed in relation to their respective pipes 18 and 26, axial movement is effectively stopped upon engagement.

As the intermediate pipe 34 is insulated from heat transfer from the exhaust gasses, the pipe 34 may be formed of a less expensive material than that of the exhaust pipe 18 and the tailpipe 26. For example, the pipe 34 may be formed of aluminum, plastic or a more economical grade of steel.

It will be seen that the flexible seal members 42 and 52, along with the lesser degree of flexibility in the heat-insulating annuli 44 and 54, will permit limited angular movement of the tailpipe extension 30 relative to the exhaust pipe 18 and the intermediate pipe 34. In order to dampen excessive relative movement of these two pipes, a plurality of bumper members 58 may be disposed on the tailpipe extension 30 adjacent the end of the exhaust pipe 18. The bumper members 58 may be of any suitable material, such as rubber or plastic, and are disposed at spaced points about the circumference of the extension 30. Thus, upon excessive movement of one of the pipes relative to the other, it will be possible for the extreme end of the exhaust pipe 18 to engage one or more of the bumper members 58 and cushion engagement of the pipe sections.

It will be apparent to those having skill in the art that the length limitations in the flexible coupling 24, or the available space beneath the vehicle, may make it difficult to construct the coupling 24 as a quarter-wave tuner. Under these conditions, the coupling structure may be shortened if, at the same time, the diameter of the intermediate pipe 34 is increased. Should the diameter of the intermediate pipe 34 be increased, it is only necessary to increase the size of the heat-insulating annuli 44 and 54 and correspondingly increase the size of the resilient seal members 42 and 52, to maintain the seals at the enlarged ends 38 and 48 of the intermediate pipe 34. Thus, the flexible coupling 24 assumes the function of a resonator rather than a quarter-wave tuner and may be of such shorter length to fit within available space.

Referring next to FIG. 4, a modification of the flexible coupling heretofore described is illustrated. The exhaust pipe 18 extends into the intermediate pipe 34 as previously described and is separated from the intermediate pipe enlargement 38 by the resilient seal 42 and the heat-insulating annulus 44. The tailpipe 26, instead of extending into the end of the exhaust pipe 18, terminates adjacent the end of the exhaust pipe 18 and spaced a short distance therefrom. Tailpipe 26 is separated from the enlargement 48 of the intermediate pipe 34 by the resilient seal member 52 and the heat-insulating annulus 54. The annular chamber 36 between the intermediate pipe 34 and the tailpipe 26 serves as a tuning volume for sounds travelling with the exhaust gasses. Thus, the space between the ends of the exhaust pipe 18 and the tailpipe 26 provides the necessary communication between the exhaust pipe 18 and the tuning volume 36. By properly dimensioning the length of the annular chamber 36, the coupling will attenuate sounds as a quarter-wave tuner for a range of frequencies.

Should space limitations beneath the vehicle make it difficult to construct the coupling illustrated in FIG. 4 as a quarter-wave tuner; i.e., because of the length required of the annular chamber 36; the coupling may be easily formed to attenuate sounds as a resonator. Since the theory of sound attenuation through the use of a resonator volume requires that the annulus inlet area be less than the annulus area of the chamber, the coupling may be adapted to this theory by enlarging the inward terminus of the tailpipe 26 so that the space between the terminus and the intermediate pipe 34 is less than the space between these elements in the annular chamber 36. The coupling will then assume the function of a resonator rather than a quarter-wave tuner.

Referring once again to FIG. 1, and in light of the foregoing description, it will be apparent that the flexible coupling 24 performs a series of functions in the exhaust system. This leads to a more efficient and less expensive exhaust construction than presently available systems. The flexible coupling 24 provides a degree of flexibility within the exhaust system to accommodate angular and limited longitudinal movements of the various members of the system relative to each other. The flexible coupling 24 also provides a sound-attenuating means for the exhaust system and may conveniently be sized to function as a quarter-wave tuner. Thirdly, the coupling acts as a vibration damper between the exhaust pipe 18 and its associated members and the tailpipe 26 with its associated members. Furthermore, it is possible to rigidly mount the tailpipe assembly 26 to the frame element 20, as illustrated schematically at 60, rather than relying on the usual combined flexible mounting and vibration damper which is normally the practice in the art. The fixed mounting is more economical and may be located at any convenient point on the tailpipe structure 26. Whatever relative movement or vibration damping must be accommodated in the system is properly handled in the flexible coupling 24.

Forwardly of the flexible coupling 24 it may be desirable to provide some sort of mounting of the exhaust pipe 18 to the engine mass 10, so that the entire weight of the exhaust system is not hung between the exhaust manifold 16 and the fixed mounting 60 located rearwardly on the tailpipe 26. For this purpose a second fixed mounting, indicated generally by the numeral 62 and shown schematically, may be provided on the exhaust pipe 18 and securing the exhaust pipe 18 at some convenient place on the engine mass 10, as at the transmission housing 14.

Thus, a flexible coupling is provided which is particularly suited to exhaust pipe systems for motor vehicles and which may be constructed as to serve a plurality of functions, all of which lead to more efficient and less expensive exhaust system design. The flexible coupling permits angular movement of the first and second pipe sections relative to each other, and at the same time provides vibration damping to prevent transmission of vibrations from one pipe section to another. The overall result is a more efficient and economical pipe construction, leading to more versatile and adaptable exhaust system design by including the coupling as a sound-attenuating member along with its other functions.

I claim:

1. A flexible pipe coupling comprising: a first pipe having a first annular heat-insulating collar on a portion thereof; a second pipe spaced from said first pipe and extending generally axially therefrom said second pipe having a second annular heat-insulating collar on a portion thereof; an intermediate pipe received over said portion of said first pipe and said portion of said second pipe, said intermediate pipe and said second pipe forming an elongated annular chamber therebetween communicating with the space between said first pipe and said second pipe; first resilient O-ring sealing means disposed between said first collar and said intermediate pipe; and second resilient O-ring sealing means disposed between said second collar and said intermediate pipe; said first and second resilient sealing means having a cross-sectional thickness in the radial direction which is small relative to the diameter of said pipes, said first and second resilient sealing means being compressed between the respective pipes to an extent great enough to provide continuous sealing engagement between the inner and outer periphery thereof and the respective pipes whereby said sealing means permits limited movement of said pipes relative to each other and defines terminations of said annular chamber.

2. The pipe coupling set forth in claim 1 and further including first and second means adjacent the respective ends of said intermediate pipe and adapted to engage the first and second collars, respectively, for limiting axial movement of said intermediate pipe relative to said first or said second pipes.

3. The pipe coupling set forth in claim 1 wherein said second pipe is coaxially received in said first pipe and annularly spaced therefrom.

4. The pipe coupling set forth in claim 3 and further including resilient bumper means disposed on one of said pipes and adjacent the end of the other of said pipes and engageable thereby.

5. The pipe coupling set forth in claim 3 and further including resilient bumper means disposed on one of said pipes and adjacent the end of the other of said pipes and engageable thereby, and means on said intermediate pipe for limiting axial movement of said intermediate pipe relative to said first or said second pipes.

6. For use in automotive exhaust systems, a flexible pipe coupling adapted to maintain first and second pipes sealed against leakage of hot exhaust gasses throughout a limited movement of the pipes, said pipe coupling comprising first and second pipes and an intermediate pipe, the first pipe and the intermediate pipe being disposed in a first telescoping relationship with an annular space therebetween throughout an overlap region, a first collar of heat-insulating material mounted on the first pipe, first resilient sealing means of annular configuration disposed between the first collar and the intermediate pipe intermediate the ends of the overlap region, the second pipe and the intermediate pipe being disposed in a second telescoping relationship with an annular space therebetween throughout an overlap region, a second collar of heat-insulating material mounted on the second pipe, second resilient sealing means of annular configuration disposed between the second collar and the intermediate pipe intermediate the ends of the overlap region, each of said first and second sealing means being substantially circular in cross section in its undeformed condition and having a cross-sectional diameter which is small relative to the diameter of said pipes, said sealing means being radially compressed between the respective pipes to an extent great enough to prevent leakage of said gasses but small enough so that the sealing means engages the pipes over a line contact which is narrow relative to the cross-sectional diameter of the sealing means, whereby the coupling accommodates relative angular and linear motion of the pipes without disruption of the seal therebetween by maintaining said line contact throughout said motion.

7. The invention as defined in claim 6 wherein the collars have a greater radial thickness at its ends than at its intermediate portion and said sealing means is seated at the intermediate portion thereof.